UNITED STATES PATENT OFFICE.

WILLIAM R. BRANDRIFF, OF SPRINGFIELD, OHIO.

IMPROVEMENT IN PROCESSES FOR COATING SEEDS PREPARATORY TO PLANTING.

Specification forming part of Letters Patent No. 181,136, dated August 15, 1876; application filed January 22, 1876.

*To all whom it may concern:*

Be it known that I, WILLIAM R. BRANDRIFF, of the city of Springfield, county of Clarke and State of Ohio, have invented a certain Process for Coating Cotton or other Fibrous Seed, so as to separate the same for drilling by machine or otherwise, of which the following is a specification:

My process for coating the cotton-seed preparatory to planting, is as follows: I take any quantity of the seed which may be required for planting, place it in a suitable vessel which will hold liquids, and pour over it as much of the silicate of soda or silicate of potash as may be sufficient to wet it until the fiber is completely laid down upon the seed, making it not only smooth, but separating in the most perfect manner one seed from another, so that they can be sown in machine-drills as readily as wheat or other non-fibrous grains.

Any of the soluble silicates will answer for this purpose, as they are equally efficacious in coating the seed. The process can be done at any time before planting the seed, the only time necessary is in drying the seed so as to render the coating complete before they are used for planting. The silicate readily decomposes in the earth.

Many preparations have been used for coating cotton-seed so as to individualize or separate them in order that they can be sown by machinery, but without any degree of success, and as the present value of the seed for the manufacture of oil renders it a marketable product, the great waste in sowing it in large and irregular quantities is saved by my process.

The labor of chopping out the stalks after it has arrived at a stand is entirely avoided, and that expense saved by the planter. The silicate also answers as an excellent fertilizer.

I do not confine myself to any specified quantity of any of the silicates in obtaining my process, just a sufficient amount being necessary to thoroughly wet down the fiber and make it adhere firmly to the kernel.

I claim as my invention—

The processes of preparing cotton or other fibrous seeds for planting, which consists in dipping the seed in a solution of silicate of soda or silicate of potash, substantially as described.

WILLIAM R. BRANDRIFF.

Attest:
    B. C. CONVERSE,
    S. W. RAY.